United States Patent Office 3,451,498
Patented June 24, 1969

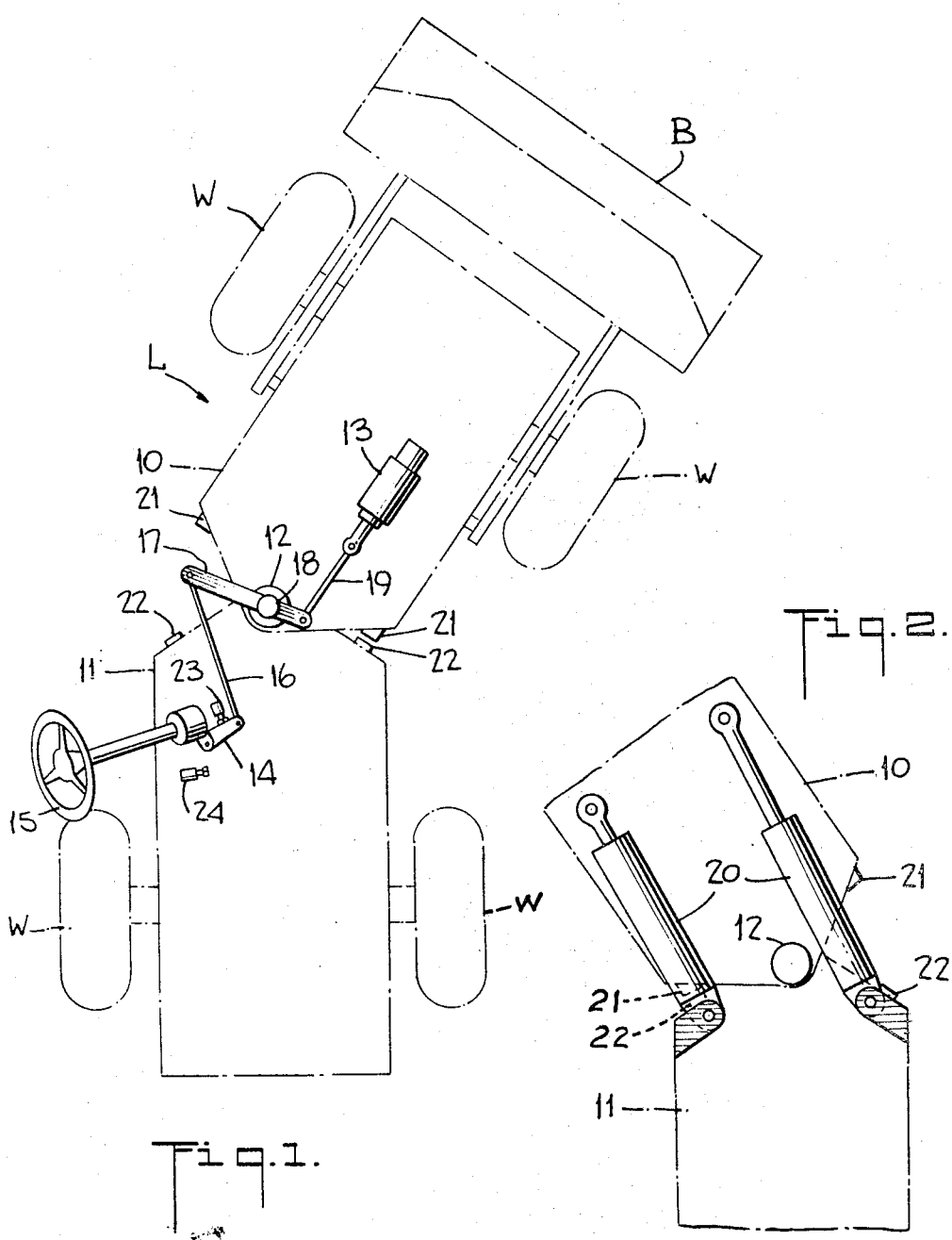

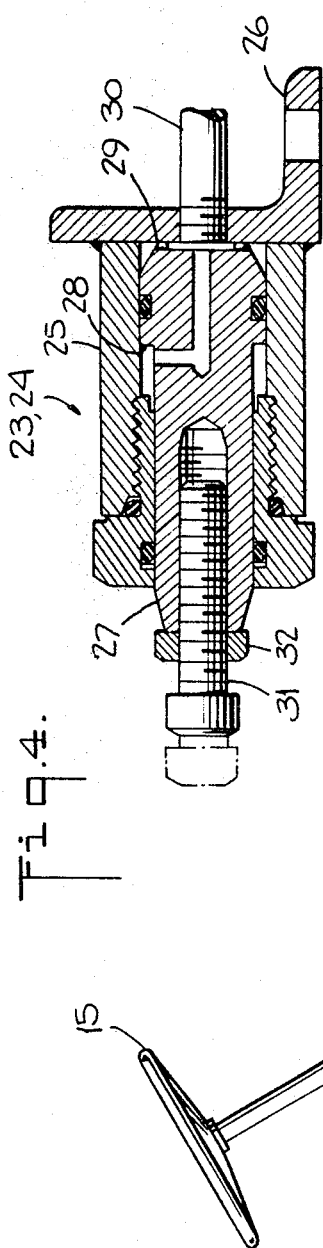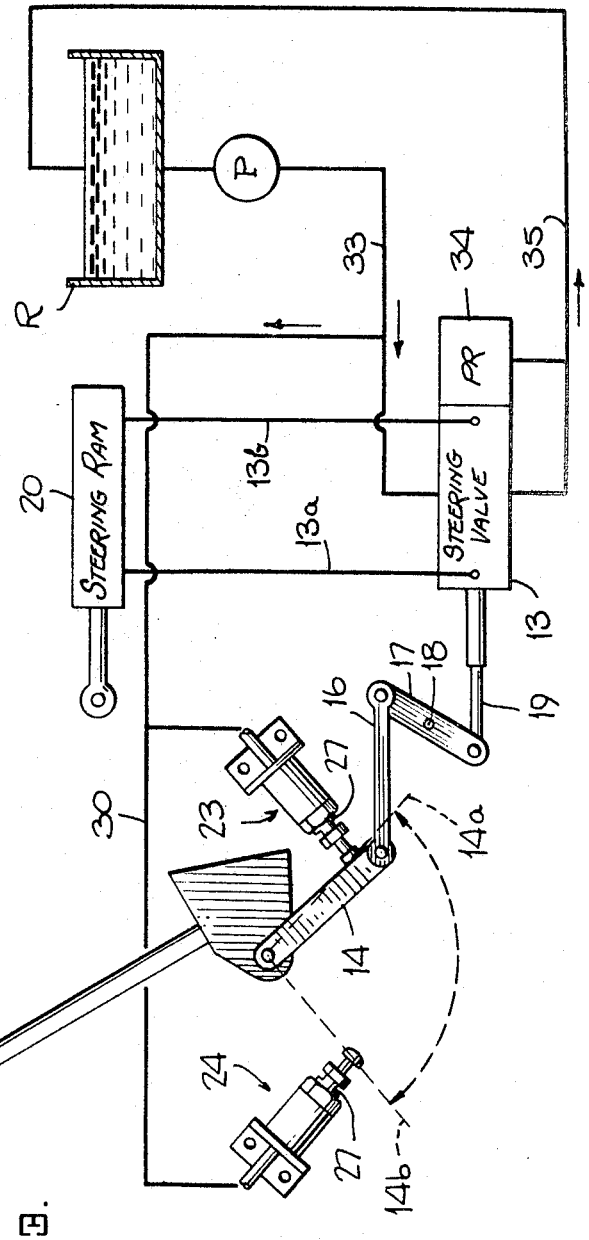

3,451,498
HYDRAULIC STEERING CONTROL
FOR SHARP STEERING
Lloyd A. Molby, Elba, N.Y., assignor to Eaton Yale &
Towne Inc., Cleveland, Ohio, a corporation of Ohio
Filed May 23, 1967, Ser. No. 640,542
Int. Cl. B62d 5/06
U.S. Cl. 180—79.2               8 Claims

ABSTRACT OF THE DISCLOSURE

The fluid pressure existing in a hydraulic steering mechanism acts against a pair of small pistons that are mounted in position to be engaged by the pitman arm of the steering wheel as the arm moves toward extreme steering positions. The pitman arm can depress a piston, but when the fluid pressure becomes very high, as due to an extreme steered position of the vehicle, the pressure causes the piston to press the pitman arm somewhat away from extreme position so that the steering valve no longer directs fluid pressure to the vehicle. That enables the fluid pressure to return to a normal value so that the pressure relief valve need not discharge large amounts of fluid.

---

My invention relates to a novel steering valve control for a hydraulic power steering mechanism on a vehicle.

As will be appreciated, it is important that the operator of a vehicle be able to steer sharply at times, with the steered part of the vehicle moving to the extreme position permitted by the consrtuction of the vehicle. Hydraulic power steering mechanisms generally enable the operator to steer effectively and are much to be desired, but I have found that considerable trouble may develop due to the manner in which the mechanisms act when steering sharply. The operator, in his desire to steer as sharply as possible, will hold his steering wheel in an extreme position after the steered part of the vehicle has moved to its extreme position and can move no farther. With the steering wheel so held, the steering valve of the usual mechanism will continue to direct the hydraulic fluid to the steered part of the vehicle, and the fluid then develops great pressures. Those pressures cause various difficulties and sooner or later will injure the hydraulic mechanism.

When the vehicle is a heavy materials handling vehicle, as for example an articulated shovel loader, the effects of extreme steering become more troublesome. The effective operation of a shovel loader requires that it be steered at a sharp angle much of the time, and moreover, the steering of the articulated construction requires a very high rate of fluid flow in the hydraulic mechanism. Upon steering to an extreme position, the hydraulic mechanisms now in use will discharge the high rate of flow at extremely high pressure through a pressure relief valve. When the flow discharges in that way, there is much heat generated, with an accompanying power loss, and there also is a destructive effect upon the valve. All of these undesirable effects are increased by the large amount of sharp steering that is necessary incidental to the operations of the loader.

Through the contribution of my invention, to be described in the specification, I am able to improve the functioning of a hydraulic steering mechanism, substantially eliminating the difficulties that are due to sharp steering.

As an important feature of my invention there are means responsive to the operation of a hydraulic steering mechanism for moving the manual controls of the mechanism. More particularly, there are means that will be effective for pressing the manual controls, such as a steering wheel, away from an extreme steering position when the steered part of the vehicle moves to extreme position. The pressure thus applied to the steering wheel will be effective normally to move the wheel and the steering valve that it operates, so that the valve no longer will direct fluid pressure to the steered port of the vehicle. As a preferred part of this feature, the operator may forcibly hold the wheel in extreme position, should he believe that further fluid pressure is necessary.

I may utilize in my invention a piston that will be engaged by the steering wheel or by a part connected to the steering wheel, as the wheel moves toward an extreme steering position. To move fully to extreme position, the steering wheel must depress the piston against the pressure of the fluid then existing in the hydraulic steering mechanism. When the vehicle also has moved to extreme steered position, the accompanying rise in fluid pressure against the piston will be effective for pressing the steering wheel away from extreme steering position, moving the steering valve so that objectionable pressures no longer will develop and the fluid need not be discharged past a relief valve.

The pressure of the piston naturally will affect the amount of effort that is necessary to move to hold the steering wheel in extreme position. Thus, as a feature of my invention I utilize means that will enable the operator of a vehicle to sense that he is steering near an extreme position. Those means also will enable him to sense the steering movements of the vehicle.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention.

Referring now to the drawings:

FIG. 1 shows rather diagrammatically an articulated shovel loader utilizing my novel steering valve control.

FIG. 2 shows the steering rams separately on the loader so that the construction may more easily be seen.

FIG. 3 shows a diagrammatic view of my control.

FIG. 4 shows a sectional view of a piston assembly that I may utilize in my invention.

For the purpose of describing my invention, I show in FIG. 1 of the drawings a loader L having front and rear portions 10, 11 that are connected through a pivot 12 for steering articulation relatively to each other. A materials handling bucket B is mounted on the front portion 10, and each portion 10, 11 has a pair of wheels W. I show the loader L equipped with a hydraulic steering mechanism that includes a steering valve 13 mounted on the front portion 10 of the loader, and a pitman arm 14 that is mounted on the rear portion 11 and moved by a steering wheel 15 so as to operate the steering valve 13. Connecting the pitman arm 14 and valve 13 are a link 16, a lever 17 that is mounted on a pivot 18 so as to rotate independently of the loader portions 10, 11, and a further link 19.

The stering valve 13 controls fluid pressure that may be applied to a pair of steering rams 20, FIG. 2, whereby to steer the loader through articulation of its front and rear portions 10, 11. At some point, the construction will limit the amount of steering articulation that can be had, and simply for the purposes of disclosure I show pairs of limit stops 21, 22 that will engage when the loader portions 10, 11 move to extreme steering positions.

I shall now describe the novel valve control of my invention while referring to FIG. 3 of the drawings. When moving the steering valve 13 to an extreme right or left steering position, the pitman arm 14 will rotate to corresponding extreme positions that I have represented by the dotted lines 14a, 14b in FIG. 3. I mount a pair of fluid operated devices 23, 24 in position to be engaged by the pitman arm 14 as that arm moves toward each extreme position 14a, 14b. In the construction that I prefer and that I show in FIG. 4, each device 23, 24 comprises a cylinder 25 equipped with a flange 26 through which it will be mounted on the rear portion 11 of the loader, and a piston 27 that moves in the cylinder 25. The piston 27 is formed with differential areas 28, 29 so as to reduce the effective force of the fluid pressure that may be applied to it through a hydraulic line 30, for extending the piston. The outer end of piston 27 is equipped with a screw 31, contributing a surface against which the pitman arm 14 will move, and adapted to be rotated to adjust the position in which arm 14 will lie when first touching the screw. A jam nut 32 will hold the screw 31 in adjusted position on piston 27.

As shown in FIG. 3, the hydraulic line 30 connects each device 23, 24 to a line 33 that extends between hydraulic pump P and the steering valve 13. As is usual, the pump P will draw fluid from a reservoir R and will apply fluid pressure through line 33 to valve 13, that valve being movable to direct the pressure through either of two lines 13a, 13b to steering rams 20, only one of which is shown in FIG. 3, whereby to steer the loader. In neutral position, valve 13 discharges the fluid pressure of line 33 through line 35 to reservoir R. There is a pressure relief valve 34 that I show here as a part of steering valve 13, and that will discharge fluid through line 35 when the pressure existing in the mechanism rises above a predetermined value.

It will be recalled that satisfactory operation of the loader requires that the steering mechanism should not yield when encountering forces of rather large magnitude. Therefore, the pressure relief valve 34 must be set to contain high pressures. The pressure relief valve 34 naturally will discharge higher pressures, as is necessary, but my invention enables me to control those higher pressures so that there need be little operation of the pressure relief valve, greatly reducing or eliminating the troubles to which I have alluded earlier.

Let us now see what happens when the steering mechanism operates.

Until the vehicle is sharply steered, the pitman arm 14 will not move into contact with the devices 23, 24 and those devices therefore will not oppose steering, and the operator of the vehicle may steer in the normal manner. Now, supposing that the operator begins to steer sharply, the movement of the pitman arm 14 first will place the arm in contact with the piston 27 on one of the devices 23, 24, as for example in the position shown in FIG. 3. The operator thereafter must apply greater effort while pitman arm 14 depresses the piston 27 against the fluid pressure that acts through hydraulic line 30 against the piston. As will be appreciated, the pressure will be the pressure of pump P or, in other words, the pressure that steering valve 13 is directing toward the steering rams 20. Due to that pressure, the operator will sense through steering wheel 15 that he is approaching an extreme steering position.

The operator may continue to steer toward extreme position, with pitman arm 14 further depressing piston 27 and moving toward the extreme position indicated by the dotted line 14a in FIG. 3. Steering valve 13 naturally continues to direct steering pressure to the steering rams 20, causing the vehicle portions 10, 11 to move toward their extreme steering position. When the vehicle portions are in their extreme position and can be steered no farther, the pressure of the fluid will tend to increase very much, due to the fact that rams 20 can accept no more fluid. That increase of pressure will at once act against the piston 27 in the device 23, applying a very considerable force for moving the pitman arm 14 in a direction away from the extreme steering position that is indicated by line 14a in FIG. 3. When pitman arm 14 is so moved, the steering valve 13 no longer will direct fluid pressure to steering rams 20, enabling the pressure to have a normal value so that the pressure relief valve 34 need not discharge large amounts of fluid.

If for some reason the operator of the vehicle believes that he must hold the steering wheel 15 in an extreme steering position, he may do so merely by applying sufficient effort to the wheel. I have found that my invention will operate very successfully when the effort required is thirty-five pounds, since that effort will discourage the operator from holding the wheel in extreme position, yet will allow him to do so when he wishes. To enable the operator to sense that he is steering near extreme position, an effort of nine pounds has been found satisfactory.

The particular effort that is required at the wheel 15 may be controlled through designing of the fluid operated devices 23, 24, since a skilled person will know how to proportion each piston 27 so as to apply the desired force. It naturally will be appreicated that the effort necessary to control the steering wheel 15, when near an extreme steering position, will be substantially proportional to the fluid pressures existing in the steering mechanism.

I believe that it will now be understood that my novel steering valve control will reduce to a very great extent those troubles that are due to extreme steering operation of a hydraulic steering mechanism. My invention will minimize the damage that may be due to exceedingly high fluid pressures, since those pressures seldom need exist in the mechanism. Also, there will be relatively little loss of power and generation of heat that may be due to the operation of a pressure relief valve. I believe, therefore, that those skilled in the art will understand the very considerable value of my novel steering valve control, and that the merits of my invention will be fully appreciated.

I now claim:

1. In a vehicle steering mechanism of the type having a steering valve and manually movable means for operating said valve so as to direct steering fluid pressure toward a part of the vehicle to steer said part, said valve having a tendency to maintain a flow of fluid pressure against said steered part when the manually movable means is held in an extreme steering position while said steered part is in a corresponding extreme position, the improvement that comprises a fluid operated device mounted in position engaging the manually movable means when said manually movable means moves toward extreme steering position, and means applying the steering fluid pressure to said fluid operated device to press said manually operated means in a direction away from extreme steering position, so that the steering fluid pressure will act to oppose said tendency of the steering valve to maintain the flow of pressure.

2. In the mechanism set forth in claim 1, the feature that said device has an operating portion that is moved by the manually movable means as those means move toward extreme steering position.

3. In the mechanism set forth in claim 1, the feature that said device comprises a piston that is engaged by the manually movable means as those means move toward extreme steering position, and said fluid pressure being applied to oppose the movement of said piston by the manually movable means.

4. In a vehicle steering mechanism of the type having a steering valve and manually movable means for operating said valve so as to direct fluid steering pressure toward a part of the vehicle to steer said part, the improvement that comprises a fluid operated device engaged by the manually movable means and moved by said manually movable means when said means operate the steering valve, and means applying the fluid steering pressure to said fluid operated device to oppose its movement by the manually operated means so that the operator may sense the operation of the steering mechanism.

5. In the mechanism set forth in claim 4, the feature that said device is mounted in position to leave the manually movable means free relatively to said device during a part of a movement of said manually movable means toward an extreme steering position, and to be engaged by the manually movable means as said manually movable means move farther toward extreme position.

6. In the mechanism set forth in claim 4, the feature that said device comprises a piston engaged by the manually movable means, and means applying the steering fluid pressure to the piston.

7. In a vehicle steering mechanism of the type having a steering valve for directing fluid pressure from a source of pressure to a steered part of the vehicle to steer said part, and manually movable means for operating said valve to control the steering, the improvement that comprises a piston depressed by the manually movable means while said means moves toward an extreme steering position, and means placing the source of fluid pressure in communication with the piston so that the pressure opposes the depressing movement of the piston by the manually movable means said piston applying a force that is substantially proportional to the fluid pressure of said source for pressing said manually movable means away from extreme position.

8. In the mechanism set forth in claim 7, the feature that said piston is mounted in position to be engaged by the manually movable means as said manually movable means moves near extreme steering position, so that the fluid pressure will oppose merely a final part of the movement of the manually movable means to extreme position.

References Cited

UNITED STATES PATENTS

| | | | |
|---|---|---|---|
| 2,682,929 | 7/1954 | Almond | 180—79.2 |
| 2,961,886 | 11/1960 | Forster | 180—79.2 |
| 3,130,806 | 4/1964 | Baer et al. | 180—79.2 |
| 3,363,711 | 1/1968 | Knell et al. | 180—79.2 |

KENNETH H. BETTS, *Primary Examiner.*

L. D. MORRIS, JR., *Assistant Examiner.*